Figure 1:
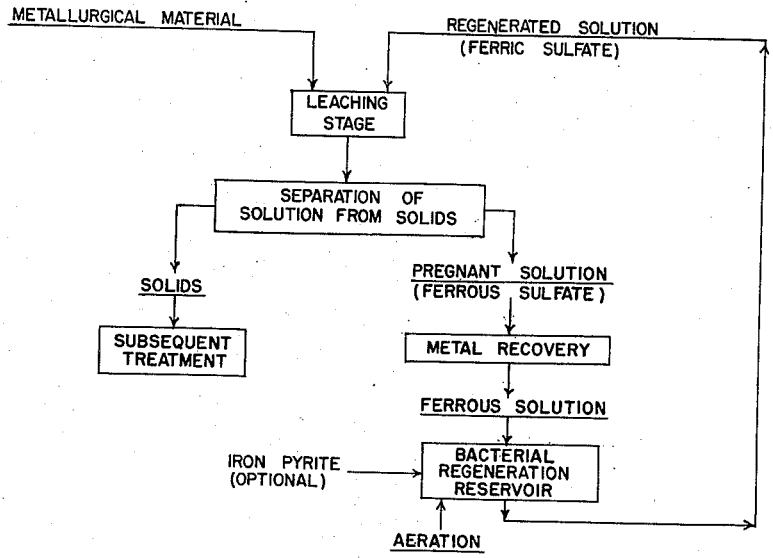

April 8, 1958  S. R. ZIMMERLEY ET AL  2,829,964

CYCLIC LEACHING PROCESS EMPLOYING IRON OXIDIZING BACTERIA

Filed Oct. 24, 1955  3 Sheets-Sheet 1

Inventors:
STUART R. ZIMMERLEY,
DEAN G. WILSON,
JOHN D. PRATER,

By

Attorneys.

April 8, 1958 S. R. ZIMMERLEY ET AL 2,829,964
CYCLIC LEACHING PROCESS EMPLOYING IRON OXIDIZING BACTERIA
Filed Oct. 24, 1955 3 Sheets-Sheet 2
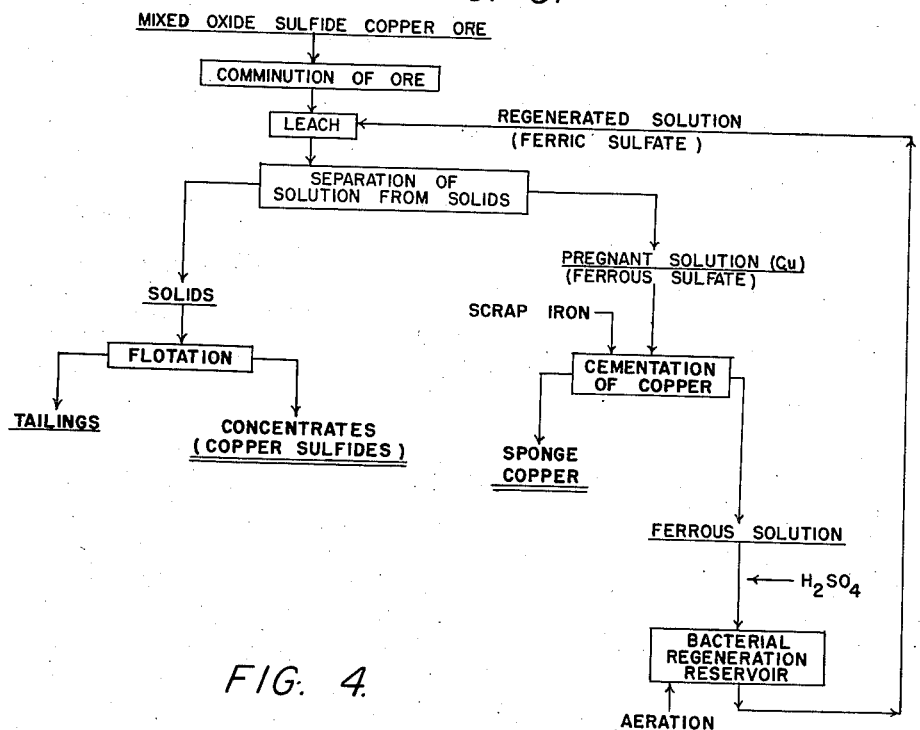
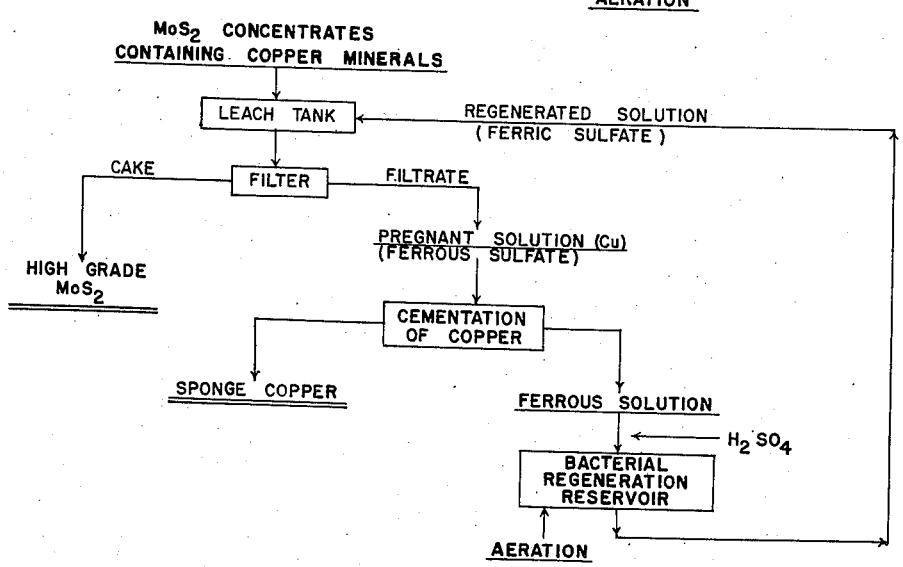
Inventors:
STUART R. ZIMMERLEY,
DEAN G. WILSON,
JOHN D. PRATER,
By
Attorneys.

April 8, 1958  S. R. ZIMMERLEY ET AL  2,829,964
CYCLIC LEACHING PROCESS EMPLOYING IRON OXIDIZING BACTERIA
Filed Oct. 24, 1955  3 Sheets-Sheet 3

Inventors:
STUART R. ZIMMERLEY,
DEAN G. WILSON,
JOHN D. PRATER,
Attorneys.

United States Patent Office 2,829,964
Patented Apr. 8, 1958

2,829,964

CYCLIC LEACHING PROCESS EMPLOYING IRON OXIDIZING BACTERIA

Stuart R. Zimmerley, Dean G. Wilson, and John D. Prater, Salt Lake City, Utah, assignors to Kennecott Copper Corporation, Salt Lake City, Utah, a corporation of New York Application October 24, 1955, Serial No. 542,387

12 Claims. (Cl. 75—104)

This invention relates to hydrometallurgical processes for extracting metals from metalliferous materials in which they are present, for example, from metalliferous ores, metallurgical concentrates, and various intermediate products of conventional milling procedures. It is concerned particularly with the leaching of sulfide minerals, utilizing a special lixiviant for the purpose.

The process of the invention involves the use and the continual regeneration of a ferric sulfate sulfuric acid lixiviant which has been innoculated with iron oxidizing, autotrophic bacteria tolerant to relatively high concentrations of the particular metal or metals to be extracted.

For many years, waste water flowing from certain copper mines has been deliberately percolated and repercolated through the ore waste dumps of such mines to leach out whatever copper values might be contained therein. The copper has been recovered by precipitation on scrap iron. In some instances, very low grade ore deposits of copper have been treated in situ in this manner, but, generally speaking, the dissolution of copper by a leaching procedure of this nature has been regarded as far too slow to be economic where other recovery processes are applicable.

It has been known in connection with this leaching of copper from mine waste dumps that ferric sulfate and sulfuric acid, present naturally in the mine waters utilized, are responsible for dissolution of copper. Furthermore, it is known that ferric sulfate is an effective lixiviant for a number of metals. For example, metallic copper and iron are readily attacked by a ferric sulfate solution. Recovery of values from certain secondary and scrap materials and upgrading of metallurgical products after a reducing roast are possible by leaching with ferric sulfate. Thus, iron-bearing chromite and iron-bearing titanium materials can be roasted with a reducing agent such as coke, and the resultant metallic iron removed with ferric sulfate solution. While lead sulfide is not readily soluble in brine solution alone, the reaction is appreciably accelerated by the addition of ferric salts to such solution. Ferric iron in solution has proven to be of value in the purification of electrolytic zinc and electrolytic manganese solutions. In these instances, the ferric iron serves as a carrier for removal of impurities from solution.

In all of these uses of ferric iron solutions as lixiviants, the ferric iron is changed to ferrous iron by reason of the chemical reaction taking place during the leaching procedure.

A principal deterrent to any widescale application of ferric sulfate sulfuric acid leaching procedures commercially has been the necessity of regenerating the spent solution before recycling it over the material being treated. In instances of acidic solutions, regeneration poses a considerable problem. Atmospheric oxidation of acidic ferrous solutions to the ferric state is slow and is not aided materially by aeration. While regeneration has been accomplished heretofore by the use of $SO_2$ gas in conjunction with aeration, industrial applications of ferric sulfate sulfuric acid leaching have been greatly hampered and limited by, among other things, the necessity of generating the $SO_2$ gas.

In recent years, research work carried out on acid mine waters emanating from coal mines in coal producing regions of the eastern part of the United States has proven the existence, in such mine waters, of iron oxidizing autotrophic bacteria which oxidize ferrous iron to ferric iron at a rate considerably greater than would be due to the atmosphere alone. The name of *Thiobacillus ferrooxidans* has been proposed for this organism.

More recently, research carried out by us in connection with acid mine waters from properties of Kennecott Copper Corporation at Bingham Canyon, Utah, and Chino, New Mexico, has proven the existence, in such mine waters, of generally similar strains of iron oxidizing autotrophic bacteria, and has definitely indicated a capacity on the part of these bacteria for acting directly on many sulfide minerals in the dissolution of same, as well as the above-mentioned capacity for changing ferrous sulfate to ferric sulfate.

We have found that these bacteria, as naturally occurring in such mine waters, withstand and grow in relatively high concentrations of copper in solution, but have low tolerance for other metals in solution. For example, the bacteria taken directly from Bingham Canyon mine waters will not grow in solutions containing more than 150 parts of zinc per million, even though they thrive in solutions containing appreciably higher concentrations of copper.

By breeding successive generations of these bacteria in culture media successively more concentrated in other dissolved metals we have produced strains of such bacteria which will tolerate solutions containing relatively great concentrations of such other metals. For example, by successive breeding in this manner, bacteria have been obtained which have a tolerance for zinc as high as approximately 17 grams per liter, i. e. 17,000 parts of zinc per million, as compared to the original zinc tolerance of 150 parts per million. Also, the tolerance of these bacteria for copper has been increased in this manner to approximately 12,000 parts per million. We have reason to believe that the tolerance of these bacteria for various metallic ions can be increased even more.

Other metallic ion concentrations to which tolerance has so far been developed in particular strains of the bacteria concerned are as follows:

| | Parts per million |
|---|---|
| Aluminum | 6290 |
| Calcium | 4975 |
| Magnesium | 2400 |
| Manganese | 3280 |
| Molybdenum | 160 |

Our work, furthermore, has definitely proven a capacity on the part of these bacteria to act directly on iron pyrites in the production of ferric sulfate therefrom, together with an excess of sulfuric acid.

The process of this invention is based upon these findings and upon the fact that we have found that the bacteria will thrive in the more concentrated solutions commonly employed where a ferric sulfate sulfuric acid lixiviant is especially prepared for leaching purposes. It is based, also, on our finding that the enhanced rate of conversion of a ferrous sulfate sulfuric acid solution to the ferric state, shown heretofore to be accomplished naturally in the waters of eastern coal mines, is not inhibited by the presence in the solution of relatively high concentrations of the metallic ion, nor by acquired tolerance to such high concentrations on the part of the bacteria concerned. In fact, an important aspect of the invention is the exceptional rapidity with which the bacteria-carrying, spent solution can be regenerated as an industrially maintained body, by mere aeration as contrasted with the troublesome and expensive regeneration procedures necessary heretofore.

Our process, then, considered as a whole, is a cyclic one, comprising use, as a lixiviant in a sulfide mineral leaching stage, of a ferric sulfate sulfuric acid solution carrying cultures of suitably tolerant, iron oxidizing, autotrophic bacteria; passing of the spent solution through a regenerative stage within which the bacteria-carrying solution is subjected to aeration; and continued recycling of the solution in the same manner.

The regeneration is preferably accomplished within a reservoir in which a body of the bacteria-containing lixiviant solution is continuously maintained. The spent solution from the leaching stage is conducted into the reservoir, and regenerated lixiviant is conducted from the reservoir for recycling over the metallurgical material being treated. In this connection, it should be realized that the solution may be repeatedly recycled over the same batch of material, or may be passed over respective successive batches of material, or may be handled in any other manner which may be considered by those skilled in the art to be good leaching practice in any given instance of use, so long as metal ions for which tolerance by the bacteria is required are not increased so rapidly or to such an extent as will eliminate the bacterial factor.

Regeneration of the ferrous sulfate sulfuric acid solution passed into the reservoir is ordinarily accomplished by mere aeration applied sufficiently vigorously to accomplish the desired regenerative result. The manner of aerating the body of solution within the reservoir will depend upon the nature of the installation, the particular material being treated, and the volume of solution to be handled. Since aeration techniques of various kinds are well-known, and, as such, do not constitute a part of the invention, it is not considered necessary to go into any great detail. The bubbling of compressed air through the solution within the reservoir, the vigorous agitation of the body of solution by mechanical means, the cascading of the solution, and even, in some instances, the provision of extensive surface area for the reservoir relative to its depth are all possible ways in which the oxygen and carbon dioxide required by the bacteria during the conversion process can be supplied. In most installations where the volume of solution to be handled is not excessive, a surge tank may be advantageously employed as the regeneration reservoir.

Since the reason for aerating the spent solution during the stage of regeneration is to supply both the oxygen and carbon dioxide required by these bacteria for continued activity and propagation, the term "aerating" as here used is to be interpreted sufficiently broadly to include any suitable procedure for introducing oxygen and carbon dioxide into the solution.

The bacteria involved in our process are motile, non-spore forming rods approximately 0.5 to 1.0 millimicron wide and 1.0 to 2.0 millimicrons long. They are autotrophic in character, deriving their energy from the oxidation of ferrous iron, and using carbon dioxide as a source of carbon. Organic materials are not needed for their subsistence. They require an acid medium for growth. As found in the natural mine waters of the copper producing properties of Kennecott Copper Corporation at both Bingham Canyon, Utah, and Chino, New Mexico, they appear to be substantially identical with the *Thiobacillus ferrooxidans* mentioned hereinbefore, except for possessing a natural tolerance for copper to the extent of from approximately 1 to 1.5 grams per liter of the mine water.

We have deposited a culture of the bacteria with the American Type Culture Collection, 2112 M Street, NW., Washington 7, D. C., and it has been given Collection Catalog No. 12912.

Our work with these bacteria indicates that similar iron oxidizing autotrophic bacteria may be found existing naturally in mine waters generally, and that these will possess a natural tolerance for the particular metal or metals occurring naturally in solution in the particular mine waters concerned.

Whether the bacteria be artificially bred to the appropriate metal tolerance or whether they be taken directly from nature with an initial though limited metal tolerance, they are introduced directly into the lixiviant solution utilized in the leach system of the invention.

If bred artificially, the culture media containing same is mixed with the prepared lixiviant solution. However, this is not normally the preferred way of making up the bacterial lixiviant solution. It is usually more advantageous to utilize mine water containing naturally tolerant bacteria as the aqueous phase of an otherwise standard ferric sulfate sulfuric acid lixiviant solution, and to increase the tolerance of the bacteria by the gradual build up of the metal ion or ions as an incident to the carrying on of the leaching procedure. It will be realized, of course, that under the latter circumstances, control must be exercised to insure such a gradual build up of the concentration of such metal ion or ions as to effectively breed resistant strains of the bacteria, without wiping them out completely.

As a guide to the building up of bacterial tolerance in this manner, we cite a typical laboratory test which was conducted by circulating mine water taken from the Bingham Canyon, Utah, operation of Kennecott Copper Corporation, over copper tailings from the Chino Mines Division of that corporation.

A quantity of 100 milliliters of mine water that had passed over the mine dumps and through the copper precipitation plant, was used. Analysis showed a copper concentration of 0.26 gram per liter. It was circulated over 100 grams of the tailings, and analyses for copper concentration were made periodically with the following results:

| Elapsed Time, Days | Cu Concentration, g./l. |
|---|---|
| 0 | 0.26 |
| 15 | 3.15 |
| 29 | 4.54 |
| 39 | 5.32 |
| 59 | 9.63 |
| 86 | 11.59 |
| 119 | 11.74 |

The final copper concentration of 11.74 grams per liter achieved in this test was above that which would normally be maintained in a working leach circuit. The leach solution was teeming with active bacteria, and effective bacterial regeneration of the leach solution was being carried out on a continuing basis.

Tolerance for zinc in solution was built up in a somewhat similar manner. A zinc-free leach solution was inoculated with bacteria having no natural tolerance for zinc, and was then circulated over sphalerite (zinc sulfide). Tolerance for zinc was acquired to an ever increasing extent by successive generations of the bacteria as the zinc ion built up in the solution by reason of dissolution of the sphalerite.

In this instance, the lixiviant solution was a synthetic nutrient made up of 0.15 gram ammonium sulfate, 0.05 gram potassium chloride, 0.50 gram hydrous magnesium sulfate, 0.05 gram potassium hydrogen phosphate, and 0.01 gram calcium nitrate in 1 liter of water. Sulfuric acid formed gradually as the leaching progressed.

Tests were made both with sphalerite alone and with a mixture of sphalerite and pyrite. Results are set forth in the following table:

| Elapsed Time, Days | Sphalerite plus Pyrite | | Sphalerite Zn, g./l. |
|---|---|---|---|
| | Zn, g./l. | Fe, g./l. | |
| 0 | 0 | 0 | 0 |
| 12 | 3.2 | | 0.46 |
| 25 | 9.30 | 1.68 | 1.16 |
| 32 | 10.6 | + | 1.24 |
| 39 | 11.8 | 3.9 | 1.40 |
| 46 | 12.1 | | 1.53 |
| 53 | 12.4 | | 1.60 |
| 147 | 13.6 | 6.43 | 2.75 |
| 296 | 16.8 | 7.65 | 3.74 |
| 337 | 16.93 | 7.59 | 4.04 |

The rapidity of build up of zinc concentration in the instance of sphalerite plus pyrite is no doubt attributable both to the production of ferric sulfate in and the lowering of the pH of the solution by reason of dissolution of the pyrite, thereby providing a more effective leach solution, as well as conditions more favorable to growth of the bacteria.

In applying our process in practice, control of the leaching procedure through the initial phase designed to produce effective quantities of adequately tolerant bacteria, is preferably carried out by maintaining proper pulp density (ratio of solids to liquid) to insure a safe rate of build up of the metal ions in the leach solution. By increasing the proportion of solids to liquid, the rate is increased and vice versa. Routine laboratory checks for metal ion concentration and bacterial activity are recommended on a periodic basis. In this connection, existing technical literature concerning solubility rates of various metals under leaching conditions is helpful. Examples of such literature are: "Chemistry of Leaching Calcocite," U. S. Bureau of Mines Technical Paper No. 473 (1930); "Chemistry of Leaching Bornite," U. S. Bureau of Mines Technical Paper No. 486 (1931); and "Chemistry of Leaching Covellite," U. S. Bureau of Mines Technical Paper No. 487 (1930).

In instances where it is not practical or desirable to exercise control of the leaching procedure throughout the period of time required for breeding proper tolerance, and where, consequently, it is prefered to commence the leaching operation with an adequate supply of appropriately tolerant bacteria, cultures of such bacteria may be prepared by artificial breeding in a manner indicated by the above laboratory procedures.

Thus, artificial cultures may be bred by utilizing as the culture media mine waters already containing bacteria having a certain degree of natural tolerance for the metal ion or ions concerned, or a synthetic nutrient solution may be innoculated with bacteria having either no tolerance or a naturally acquired tolerance. Such culture media carrying bacteria to be bred to tolerance or to a greater degree of tolerance than naturally possessed, may then have the particular metal ion or ions concerned built up therein in the suitably graduated manner indicated by the above laboratory tests, either by utilizing such media as a leach solution under properly controlled conditions, or by the addition to such media of properly controlled quantities of a readily soluble salt of the metal or metals concerned, for example, in the case of copper, by the periodic addition of sufficient quantities of copper sulfate to raise the copper ion content of the solution in the graduated manner indicated by the first laboratory test set forth above.

The fact that an acid environment is natural to the existence of these bacteria makes possible their effective utilization in the continuous regeneration of a lixiviant solution involving sulfuric acid content to an extent necessary to balance the ferric sulfate content. The quantity and concentration of the leach solution may be selected in accordance with the requirements of any given material to be treated and as may be found advantageous for any given mode of applying the process in practice. In this connection, it should be realized that the use of ferric sulfate sulfuric acid leach solutions, as such, is well-known in the art, and that the process of the invention will be applied in any given instance on the basis of conventional calculations with respect to the ferric iron requirements for the particular material to be treated.

It is a purpose of the present invention, therefore, to provide for the rapid, effective, and economical regeneration of a spent ferric sulfate sulfuric acid lixiviant, and to embody the same in a metallurgical leaching process having widespread commercial possibilities in the field of extractive metallurgy.

A particular feature of the process, which is optional depending upon the character of the metallurgical material being treated, is the provision of iron pyrite in the regenerative reservoir for continuously and automatically supplementing the original iron and acid content of the lixiviant.

The regenerative bacterial action that takes place in the oxidation of ferrous iron to ferric iron is represented by the following chemical equation:

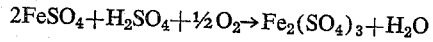
$$2FeSO_4 + H_2SO_4 + \tfrac{1}{2}O_2 \rightarrow Fe_2(SO_4)_3 + H_2O$$

In instances where the leaching action depletes the normal sulfuric acid content of the leach solution without a corresponding decrease in the iron content, hydrolysis of the ferric sulfate formed by the above reaction will often occur, resulting in precipitation of ferric salts and the release of sulfuric acid. This is represented by the following equation:

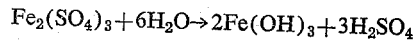
$$Fe_2(SO_4)_3 + 6H_2O \rightarrow 2Fe(OH)_3 + 3H_2SO_4$$

In circuits of the invention where there is an excess of iron in solution, for example, in those circuits where cementation of copper with respect to scrap iron is practiced as a means of recovering copper from the solution, or where the material being treated has a high iron content, such precipitation of ferric salts is not detrimental to the continued functioning of the system. However, in instances where iron in solution must be conserved, it may be necessary to add sulfuric acid in order to prevent hydrolysis.

An effective addition of ferric iron to the solution, accompanied by an excess of sulfuric acid, is accomplished by the action of the bacteria on iron pyrite in the regenerative reservoir. Thus, in accordance with the invention, this means may be employed to replenish these essential constituents of the leach solution whenever necessary. The reaction is represented by the following formula:

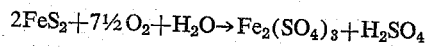
$$2FeS_2 + 7\tfrac{1}{2}O_2 + H_2O \rightarrow Fe_2(SO_4)_3 + H_2SO_4$$

In those instances where there is a tendency to drop ferric salts from the lixiviant solution of the system due to an excess of iron derived from either the metallurgical material being treated or from a cementation recovery stage, it may be necessary or desirable to bleed off portions of the solution for the passage through an iron elimination stage. Where a purpose of the leaching operation is the removal of iron impurities from a metallurgical material being treated, for example, a chromite ore having a high iron content, the iron elimination stage may take the place of the usual metal recovery stage.

In utilizing our process industrially, we have found that certain precautions must be taken to insure success. Thus, the equipment utilized throughout the circuit must normally be such as will not release or act as bactericides under the conditions prevailing during processing. For example, we have found that redwood tanks, launders, etc., as employed at many mining and milling properties, release a bactericide which ordinarily makes the process impossible. In this connection, however, we have also found that the bacteria can be bred to tolerate this condition. Therefore, it is imperative that any unknown factors be tested in the laboratory for their effect on the bacteria prior to incorporation into any contemplated system, and that any factor proven to be harmful be discarded unless a strain of bacteria satisfactorily tolerant thereto can be bred.

Another precaution is the maintaining of the lixiviant solution at a temperature which will not unduly inhibit the growth of or destroy the bacteria. In some instances, bacterial activity has been maintained at a temperature as high as 50° C., though it is safer to work at a somewhat lower temperature. Otherwise, the higher the temperature the greater the degree of bacterial activity. The practical upper limit may be regarded as approximately 40° C. While limited activity is still apparent at 0° C., the lowest practical limit is approximately 15° C.

Typical applications of the process in practice are shown by the several flow sheets set forth in the accompanying drawings.

Figure 2:
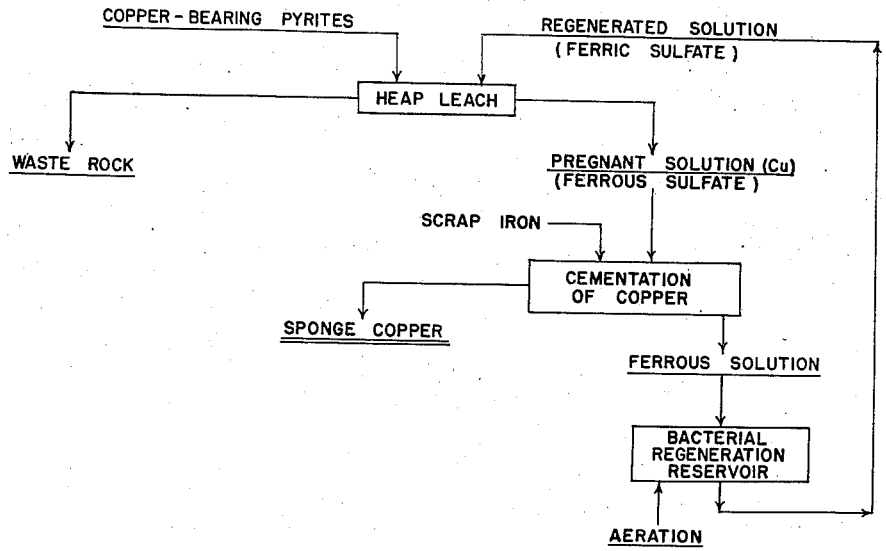
Figure 5:
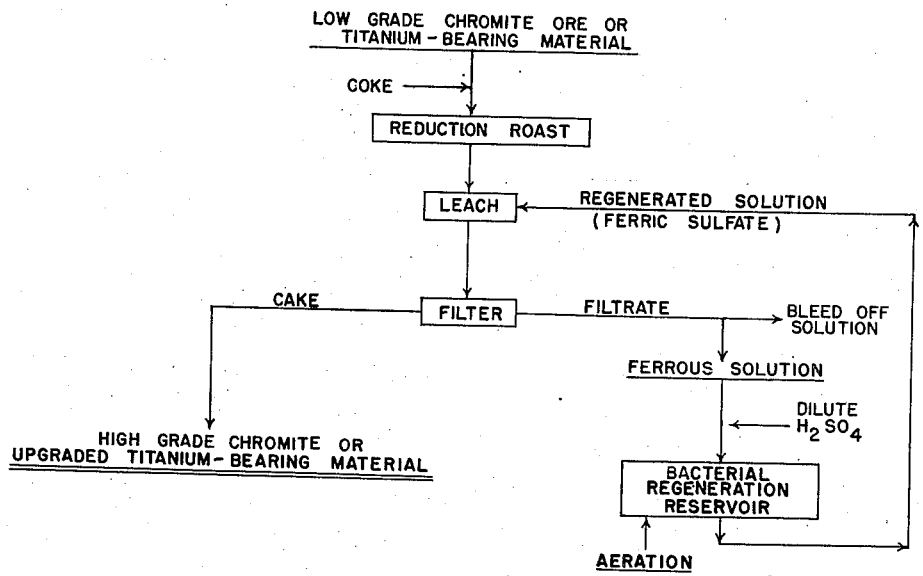
Figure 6:
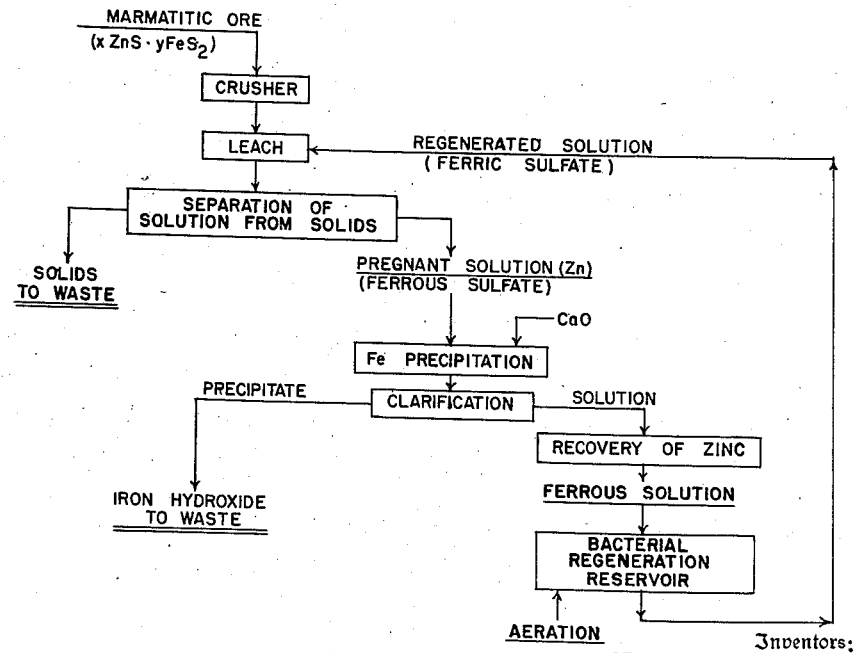

In the drawings:

Fig. 1 represents a flow sheet having general application to amenable metallurgical materials and indicating optional addition of iron pyrite to the bacterial regeneration reservoir, the desirability of the latter depending largely upon the particular material being treated;

Fig. 2, a flow sheet specific to the treatment of copper-bearing pyrite ores;

Fig. 3, a flow sheet specific to the treatment of mixed oxide-sulfide copper ores;

Fig. 4, a flow sheet specific to the treatment of molybdenite concentrates derived from general flotation concentrates of molybdenite-bearing, copper sulfide ores;

Fig. 5, a flow sheet specific to either the upgrading of a low grade chromite ore having a high iron content or to similar titanium-bearing material; and Fig. 6, a flow sheet specific to the treatment of a zinc sulfide ore, specifically marmatitic ore, for the recovery of zinc.

Referring to the drawings:

Specific applications of the process all involve a cyclic flow circuit for a ferric sulfate sulfuric acid lixiviant, including a bacterial regenerative stage for the spent solution.

This is exemplified by the generalized flow sheet of Fig. 1, where the ferric sulfate sulfuric acid solution is brought into contact in any suitable manner with the metallurgical material to be leached. Following separation of the pregnant and spent solution from the undissolved solids, which may be by decanting, filtration, etc., such solution—now in the ferrous state—is generally passed to a metal recovery or removal stage of any suitable character depending upon the particular metal or metals concerned, while the solids are either retained for the recycling thereover of regenerated lixiviant solution, or are passed from the circuit for subsequent treatment or for discharge to waste.

The spent, ferrous solution is conducted from the metal recovery or removal stage to a reservoir of type dependent upon the scale of operations, for example, a surge tank. It is here that the ferrous solution is oxidized and regenerated by bacterial action, so that it reverts to its original ferric state. An appropriate strain of the bacteria concerned is initially introduced into the reservoir for that purpose, and the body of bacteria-carrying, ferrous solution within the reservoir is subjected to aeration.

Regenerated lixiviant solution, now in the required ferric state, is conducted from the regeneration reservoir and back to the material leach stage, for repetition of the processing cycle.

The remaining flow sheets all involve specific leach circuits conforming to the process of the invention and following in general the flow sheet of Fig. 1.

In Fig. 2, there is illustrated an application of the present process to copper-bearing pyrite, utilizing a heap leach procedure with ferric sulfate sulfuric acid solution as the lixiviant. The lixiviant solution, in its spent, ferrous state and pregnant with copper, is conducted from the leaching stage to a conventional cementation stage, where the copper is precipitated as a sponge on scrap iron. From there, the ferrous solution is passed into a suitable bacterial regeneration reservoir containing bacteria tolerant to copper, and is aerated therewithin. In this application of the invention, the lixiviant solution is recycled repeatedly through the same heap of ore until the copper values are fully dissolved.

In Fig. 3, the process is illustrated as applied to mixed oxide and sulfide copper ores. The ore is first comminuted to appropriate size for most effective leaching. Here, where the fully leached solids are sent to flotation for the further concentration of copper sulfides, comminution of the ore will be by crushing and grinding to a suitable flotation size. Following the dissolving of the oxide copper from the ore at the leaching stage, the spent leach solution is separated from the solids, as indicated, and passed to a conventional cementation stage for the recovery of copper, the solids being passed to flotation for the concentration of copper sulfide. The ferrous solution from the cementation stage is conducted to a bacterial regeneration reservoir for aeration, and the regenerated solution is conducted back to the leach stage for recycling with respect to a new batch of the ore. Sulfuric acid is added to the system, as required.

An alternative procedure is to pass the pulp from the leaching stage directly through the copper cementation stage, followed by flotation of the pulp and passage of the ferrous solution from the tailings to the regeneration reservoir.

In Fig. 4, the process is illustrated as applied to molybdenite concentrates containing copper minerals, for example, the molybdenite concentrates produced at the Arthur Plant of the Utah Copper Division of Kennecott Copper Corporation. The concentrates from the general milling operation are introduced into a leach tank, where they are subjected to the leaching action of a ferric sulfate sulfuric acid lixiviant. Following the leach, the material is filtered, the resulting cake being constituted of high grade molybdenite and the filtrate being a spent, ferrous solution pregnant with copper. The latter is passed through a cementation stage for the recovery of the copper, and the ferrous solution therefrom is conducted to a bacterial regeneration reservoir for aeration. The regenerated solution, now in the ferric state, is conducted back to the leach tank for application to a fresh batch of the molybdenite concentrates. Again, sulfuric acid is added to the system, as required.

In Fig. 5, the process is illustrated as applied to either a low grade chromite ore high in iron content or titanium-bearing material high in iron content. The ore or other material to be processed is mixed with coke and subjected to a reduction roast for converting the iron content to metallic iron. The roasted material is then passed to a leach stage, where it is subjected to the leaching action of a ferric sulfate sulfuric acid lixiviant solution. Following the leaching operation, the spent solution is separated from the solids by filtration, the cake being constituted of high grade chromite or of upgraded titanium-bearing material, as the case may be, and the filtrate being a solution containing an excess of ferrous sulfate. Because of this excess, a portion of the solution is bled off, and make-up therefor is provided by the addition of dilute sulfuric acid, as indicated. The resulting solution is conducted to a bacterial regeneration reservoir for aeration. Regenerated solution is conducted back to the leaching stage for recycling with respect to fresh batches of the material to be treated.

In Fig. 6, the process is illustrated as applied to the recovery of zinc from a marmatitic ore. As indicated, the ore is first comminuted, as by crushing, and is then subjected to the leaching action of a ferric sulfate sulfuric acid lixiviant solution. Following the leach, the spent, ferrous solution is separated from the solids, and is treated with lime for the precipitation of iron. Following clarification of the solution, with the precipitated iron hydroxide being passed to waste, the ferrous solution, still pregnant with zinc, is passed through a suitable operation for the recovery of zinc, and the ferrous solution resulting therefrom is conducted to a bacterial regeneration reservoir for aeration. The regenerated solution is conducted back to the leaching stage for application to a fresh batch of the crushed ore.

The process of the invention, as specifically applied in the above instances, has produced recoveries consistent with the maximum to be expected from ferric sulfate sulfuric acid leaching of the respective materials concerned. The lixiviant solution is conserved in all instances for reuse indefinitely, it being only necessary to add extra solution from time to time to make-up for normal operating loss.

The addition of iron pyrite to the regeneration reservoir, as indicated in Fig. 1 to be optional, may be resorted to in any instance where the lixiviant solution is found to be deficient in ferric iron and sulfuric acid.

The specific examples set forth herein are merely illustrative of possible applications of the method in practice, and are not to be regarded as limitations.

In all of the tests made so far the optimum pH for the leach solution, from the standpoint of bacterial activity, proved to be approximately 2, though excellent results were obtained over a pH range of from 1.5 to 2.5. Bacterial activity decreased progressively and significantly below 1.5.

Laboratory work in connection with the bacterial leaching procedures described herein has indicated the possibility of enhancing bacterial activity within the leach solution by the addition of certain nutrients to such solution. Thus, working with mine water taken from the Bingham Canyon operations of Kennecott Copper Corporation, which contain bacteria having a naturally acquired tolerance for copper as indicated above, we have determined that addition of nitrogen to the solution, e. g. in the form of a nitrate or an ammonium ion, increases the bacterial activity throughout the initial phase of the leaching operation, though later phases are apparently not benefited to any significant extent. Bacterial activity increased significantly with the addition of quantities of nitrogen from 0 to 200 parts per million. However, the economic optimum was indicated as approximately 100 parts per million, inasmuch as no significant effect on the leaching operation was noted for the greater quantities. After six months of operation, solutions to which no nitrogen had been added and those to which nitrogen had been added in varying quantities became more or less equalized from a practical standpoint with respect to bacterial activity.

The present application constitutes a continuation-in-part of our copending but now abandoned application Serial No. 418,666, filed March 25, 1954, entitled "Hydrometallurgical Process."

We claim:

1. In a cyclic process for the extraction of metallic constituents of metallurgical materials, wherein the metallurgical material is subjected to the leaching action of a ferric sulfate sulfuric acid lixiviant solution, the spent lixiviant solution is conducted to a regeneration stage following each leach period, is subjected to aeration in said regeneration stage for promoting conversion of ferrous sulfate to the ferric state, is conducted from said regeneration stage back to the leaching stage for use as the lixiviant in the next cycle of the process, and the dissolved metallic constituent or constituents of said metallurgical material is separated from the pregnant lixiviant solution, the improvement comprising maintaining within the lixiviant solution an effective quantity of motile, non-spore forming, oxidizing, autotrophic, rod bacteria, which are tolerant to the metallic constituent or constituents to be extracted, whereby regeneration of said lixiviant solution in the said regeneration stage will be expedited.

2. The process recited in claim 1, wherein a reservoir of the lixiviant solution is maintained for the regenerative stage of the process, and iron pyrite is maintained within the reservoir.

3. The process recited in claim 1, wherein the lixiviant solution is initially innoculated with cultures of the said iron oxidizing autotrophic bacteria whose tolerance for the metallic constituent or constituents to be extracted has been achieved by artificial breeding on culture media containing progressively greater concentrations of the metal ion or ions concerned.

4. The process recited in claim 1, wherein the metallurgical material comprises copper-bearing pyrite; and wherein metallic copper is recovered from the lixiviant solution by cementation on metallic iron.

5. A cyclic process for the extraction of copper from mixed oxide and sulfide copper ores, comprising comminuting the ore; subjecting the comminuted ore to the leaching action of a ferric sulfate sulfuric acid lixiviant solution carrying an effective quantity of motile, non-spore forming, iron oxidizing, autotrophic, rod bacteria tolerant to copper, whereby regeneration of said solution will be expedited; conducting the spent lixiviant solution to a regeneration stage following each leach period; subjecting said spent lixiviant solution to aeration in said regeneration stage, for promoting conversion of ferrous sulfate to the ferric state; conducting regenerated solution from said regeneration stage back to the leaching stage for use as the lixiviant in the next cycle of the process; and recovering copper from the pregnant lixiviant solution.

6. A cyclic process for the extraction of copper from concentrates of molybdenite-copper minerals, comprising subjecting said concentrates to the leaching action of a ferric sulfate sulfuric acid lixiviant solution carrying an effective quantity of motile, non-spore forming, iron oxidizing, autotrophic, rod bacteria tolerant to copper, whereby regeneration of said solution; conducting the spent lixiviant solution to a regeneration stage following each leach period; subjecting said spent lixiviant solution to aeration in said regeneration stage, for promoting conversion of ferrous sulfate to the ferric state; conducting regenerated solution from said regeneration stage back to the leaching stage for use as the lixiviant in the next cycle of the process; and recovering copper from the pregnant lixiviant solution.

7. A cyclic process for the upgrading of high iron content chromite ore, comprising roasting the said ore for reducing the iron content to the metallic state; subjecting the roasting ore to the leaching action of a ferric sulfate sulfuric acid lixiviant solution carrying an effective quantity of motile, non-spore forming, iron oxidizing, autotrophic, rod bacteria, whereby regeneration of said solution will be expedited; conducting the spent lixiviant solution to a regeneration stage following each leach period; subjecting said spent lixiviant solution to aeration in said regeneration stage, for promoting conversion of ferrous sulfate to the ferric state; conducting regenerated solution from said regeneration stage back to the leaching stage for use as the lixiviant in the next cycle of the process; and removing iron from the lixiviant solution.

8. A cyclic process for the extraction of zinc from zinc-bearing sulfide materials, comprising subjecting the said material to the leaching action of a ferric sulfate sulfuric acid lixiviant solution carrying an effective quantity of motile, non-spore forming, iron oxidizing, autotrophic, rod bacteria tolerant to zinc, whereby regeneration of said solution will be expedited; passing the spent lixiviant solution to a regeneration stage following each leach period; subjecting said spent lixiviant solution to aeration in said regeneration stage, for promoting conversion of ferrous sulfate to the ferric state; conducting regenerated solution from said regeneration stage back to the leaching stage for use as the lixiviant in the next cycle of the process; and recovering zinc from the pregnant lixiviant solution.

9. A cyclic process for the upgrading of high iron content titanium-bearing materials, comprising roasting the said material for reducing the iron content to the metallic state; subjecting the roasted material to the leaching action of a ferric sulfate sulfuric acid lixiviant solution carrying an effective quantity of motile, non-spore forming, iron oxidizing, autotrophic, rod bacteria, whereby regeneration of said solution will be expedited; conducting the spent lixiviant solution to a regeneration stage following each leach period; subjecting said spent lixiviant solution to aeration in said regeneration stage, for promoting conversion of ferrous sulfate to the ferric state; conducting regenerated solution from said regeneration stage back to the leaching stage for use as the lixiviant in the next cycle of the process; and removing iron from the lixiviant solution.

10. A process for regenerating a spent ferric sulfate sulfuric acid lixiviant solution containing at least one metal in solution to an extent which is normally bactericidal, comprising introducing said solution into a reservoir; and subjecting the solution within said reservoir to aeration in the presence of an effective quantity of iron oxidizing, autotrophic, rod bacteria having tolerance for the metal or metals dissolved in said solution, whereby said regeneration will be expedited.

11. The process recited in claim 5, wherein a reservoir of the lixiviant solution is maintained for the regenerative stage of the process, and iron pyrite is maintained within the reservoir.

12. The process recited in claim 6, wherein a reservoir of the lixiviant solution is maintained for the regenerative stage of the process, and iron pyrite is maintained within the reservoir.

References Cited in the file of this patent
UNITED STATES PATENTS

| | | |
|---|---|---|
| 759,670 | Clark | May 10, 1904 |
| 2,563,623 | Scott | Aug. 7, 1951 |

OTHER REFERENCES

"Industrial Wastes" (Rudolfs et al.), publ. by Reinhold Publ. Corp. (New York), 1953. (Pages 339–341 relied on.)

"Water Supply and Waste-Water Disposal" (Fair et al.), publ. by John Wiley & Sons (New York), 1954. (Pages 505–506 relied on.)